United States Patent
Neth et al.

(10) Patent No.: US 9,826,386 B2
(45) Date of Patent: Nov. 21, 2017

(54) CONFIGURING A MACHINE-TO-MACHINE MODEM

(71) Applicant: Verizon Patent and Licensing Inc., Arlington, VA (US)

(72) Inventors: Craig Allen Neth, Hollis, NH (US); Dipen Pareshbhai Patel, Nashua, NH (US); Gary L. Grebus, Brookline, NH (US); Nilangshu Bidyanta, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 21 days.

(21) Appl. No.: 14/923,866

(22) Filed: Oct. 27, 2015

(65) Prior Publication Data
US 2017/0118619 A1 Apr. 27, 2017

(51) Int. Cl.
*H04W 4/00* (2009.01)
*H04W 8/00* (2009.01)

(52) U.S. Cl.
CPC ........... *H04W 8/005* (2013.01); *H04W 4/005* (2013.01)

(58) Field of Classification Search
CPC .............................. H04W 8/005; H04W 4/005
USPC ........................................................ 455/434
See application file for complete search history.

(56) References Cited

U.S. PATENT DOCUMENTS

| 9,317,688 | B2* | 4/2016 | Yegin | G06F 21/57 |
|---|---|---|---|---|
| 2012/0044865 | A1* | 2/2012 | Singh | H04W 24/02 370/328 |
| 2013/0021946 | A1* | 1/2013 | Pan | H04W 60/00 370/254 |
| 2014/0003234 | A1* | 1/2014 | Chou | H04W 4/005 370/230 |
| 2014/0330925 | A1* | 11/2014 | Lee | H04W 4/006 709/217 |
| 2015/0065129 | A1* | 3/2015 | Lee | H04W 52/028 455/435.1 |
| 2015/0110030 | A1* | 4/2015 | Kim | H04W 24/10 370/329 |
| 2017/0099157 | A1* | 4/2017 | Jacobson | H04L 12/2814 |

* cited by examiner

*Primary Examiner* — Shahriar Behnamian (57) ABSTRACT

A machine-to-machine (M2M) modem may receive a request for device information identifying one or more M2M devices that are connected with the M2M modem. The M2M modem may obtain the device information associated with the one or more M2M devices. The M2M modem may provide the device information. The M2M modem may receive configuration information, based on which to communicate with the one or more M2M devices, based on providing the device information. The M2M modem may communicate with the one or more M2M devices based on the configuration information.

20 Claims, 7 Drawing Sheets

CONFIGURING A MACHINE-TO-MACHINE MODEM

BACKGROUND

A machine-to-machine communication (M2M) device (e.g., a "thing" in the Internet of Things) may perform functions based on receiving instructions. For example, the M2M device may collect and provide sensor information, may open or close a switch, or the like. Different M2M devices may be associated with different instructions, different data types, different information formats, different device libraries, or the like. In some cases, multiple M2M devices may be implemented in a particular environment (e.g., a house, a business, a building, etc.).

DETAILED DESCRIPTION OF PREFERRED EMBODIMENTS

The following detailed description of example implementations refers to the accompanying drawings. The same reference numbers in different drawings may identify the same or similar elements.

An M2M device (e.g., a smart device, such as a smart light bulb, a smart refrigerator, a sensor, a medical device, etc.) may provide information to and/or receive information from another device via a mobile network. The M2M device may use a particular messaging protocol, data format, or the like, to provide and/or receive the information. Different M2M devices may use different messaging protocols, data formats, or the like. Therefore, a device that interacts with a variety of M2M devices may require specialized configuration for each M2M device with which the device interacts.

Implementations described herein enable an M2M modem to communicate with one or more M2M devices based on respective configuration information (e.g., device libraries, messaging protocols, etc.) associated with each M2M device of the one or more M2M devices. The M2M modem may obtain the configuration information by providing device information associated with the one or more M2M devices, and/or a unique identifier associated with the M2M modem, to a modem control device via the mobile network, which conserves resources used to implement and/or configure the M2M modem. In some implementations, the M2M modem may transmit and/or receive messages that are equal to or smaller than a particular size (e.g., 256 bytes, 128 bytes, etc.) which conserves network resources. In this way, the M2M modem conserves processor resources that would otherwise be used to configure a device to communicate with each M2M device of the one or more M2M devices, by communicating with each M2M device based on M2M modem firmware that is implemented on the M2M modem (e.g., without modifying the M2M modem firmware to enable the M2M modem to communicate with each M2M device). In some cases, multiple M2M modems may communicate with multiple, different M2M devices based on the M2M modem firmware, which permits the modem control device to control the multiple, different M2M devices via the multiple M2M modems based on the M2M modem firmware. In this way, the M2M modem firmware conserves processor and storage resources of the modem control device.

Figure 1A:
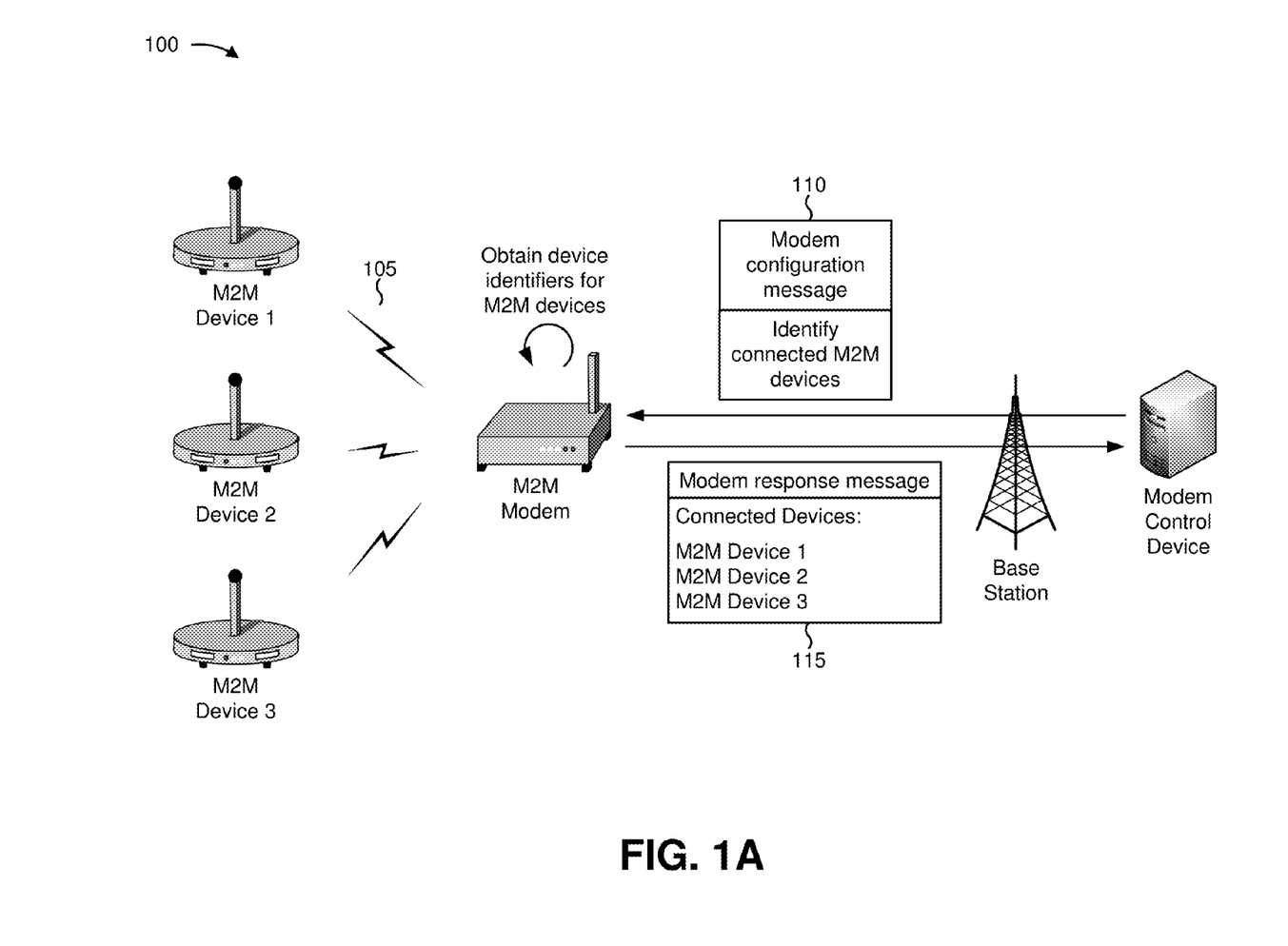
FIGS. 1A-1C are diagrams of an overview of an example implementation described herein.

FIGS. 1A-1C are diagrams of an overview of an example implementation 100 described herein. As shown in FIG. 1A, and by reference number 105, an M2M modem may be connected with a set of M2M devices (e.g., M2M Device 1, M2M Device 2, and M2M Device 3). Assume that each of the M2M devices uses different configuration information to communicate with the M2M modem. For example, M2M Device 1 may be associated with a different device library, a different format of sensor information, a different communication protocol, a different communication format, a different firmware version, or the like, than M2M Device 2 and/or M2M device 3. In some implementations, the M2M modem may be integrated with (e.g., included in, a component of, etc.) one or more of the M2M devices. Additionally, or alternatively, the M2M modem may be implemented separately from the M2M devices, and may connect with the M2M devices wirelessly (e.g., via a wireless local area network (WLAN), such as a WiFi network or a Bluetooth network, a local cellular network, etc.).

As shown by reference number 110, a modem control device may transmit a modem configuration message to the M2M modem via a base station. As further shown, the modem configuration message may request that the M2M modem identify M2M devices with which the M2M modem is connected. As shown, based on the modem configuration message, the M2M modem may obtain device information for the set of M2M devices. The device information may include, for example, network addresses associated with the M2M devices, device types of the M2M devices, device versions of the M2M devices, or the like, as described in more detail in connection with FIG. 4, below. In some implementations, the M2M modem may store the device information locally (e.g., after receiving the device information from the set of M2M devices, etc.). Additionally, or alternatively, the M2M modem may obtain the device information from the set of M2M devices (e.g., by requesting the device information based on the modem configuration message, etc.).

As shown by reference number 115, the M2M modem may provide a modem response message to the modem control device. As further shown, the modem response message may identify the connected M2M devices (e.g., M2M Device 1, M2M Device 2, and M2M Device 3). For example, the modem response message may include the device information associated with the connected M2M devices. In this way, the modem control device obtains device information for the set of M2M devices by communicating with the M2M modem, which conserves processor resources, time, and money that may otherwise be used to manually provide the device information to the modem control device.

Figure 1B:
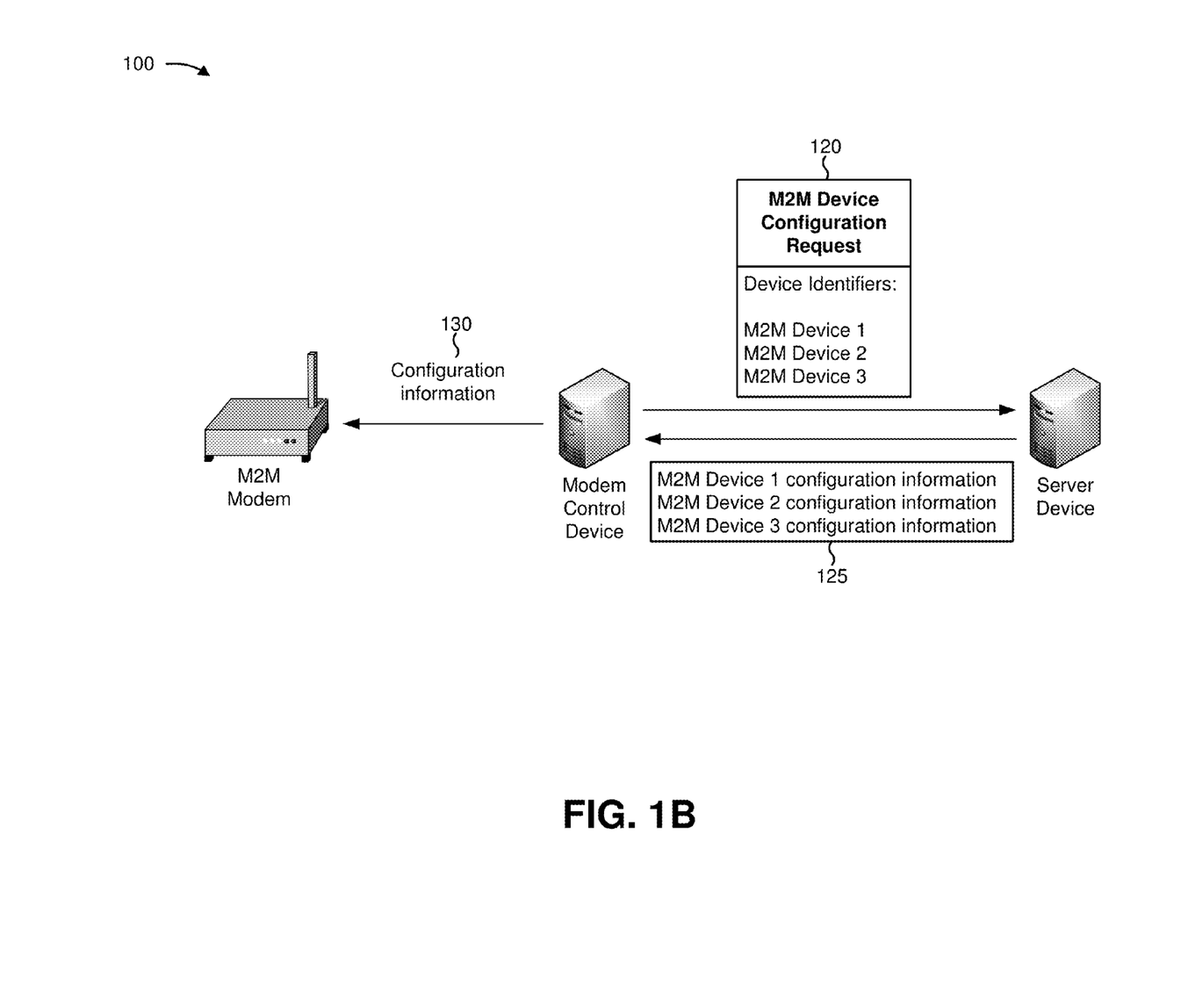

As shown in FIG. 1B, and by reference number 120, the modem control device may provide, to a server device, an M2M device configuration request that includes device information for the set of M2M devices. Assume that the server device stores configuration information (e.g., device libraries, messaging protocols, command strings, etc.) for M2M devices based on device information associated with the M2M devices. For example, the server device may store device libraries for particular M2M devices in association with device information identifying the particular M2M devices and/or a type of the particular M2M devices. As shown by reference number 125, based on the device information for the set of M2M devices, the server device may provide configuration information for the set of M2M devices to the modem control device. As shown by reference number 130, the modem control device may provide the configuration information to the M2M modem. In this way, the modem control device causes the M2M modem to be configured to interact with the set of M2M devices based on configuration information, which conserves processor resources, time, and money that may otherwise be needed to manually configure the M2M modem and/or the modem control device.

Figure 1C:
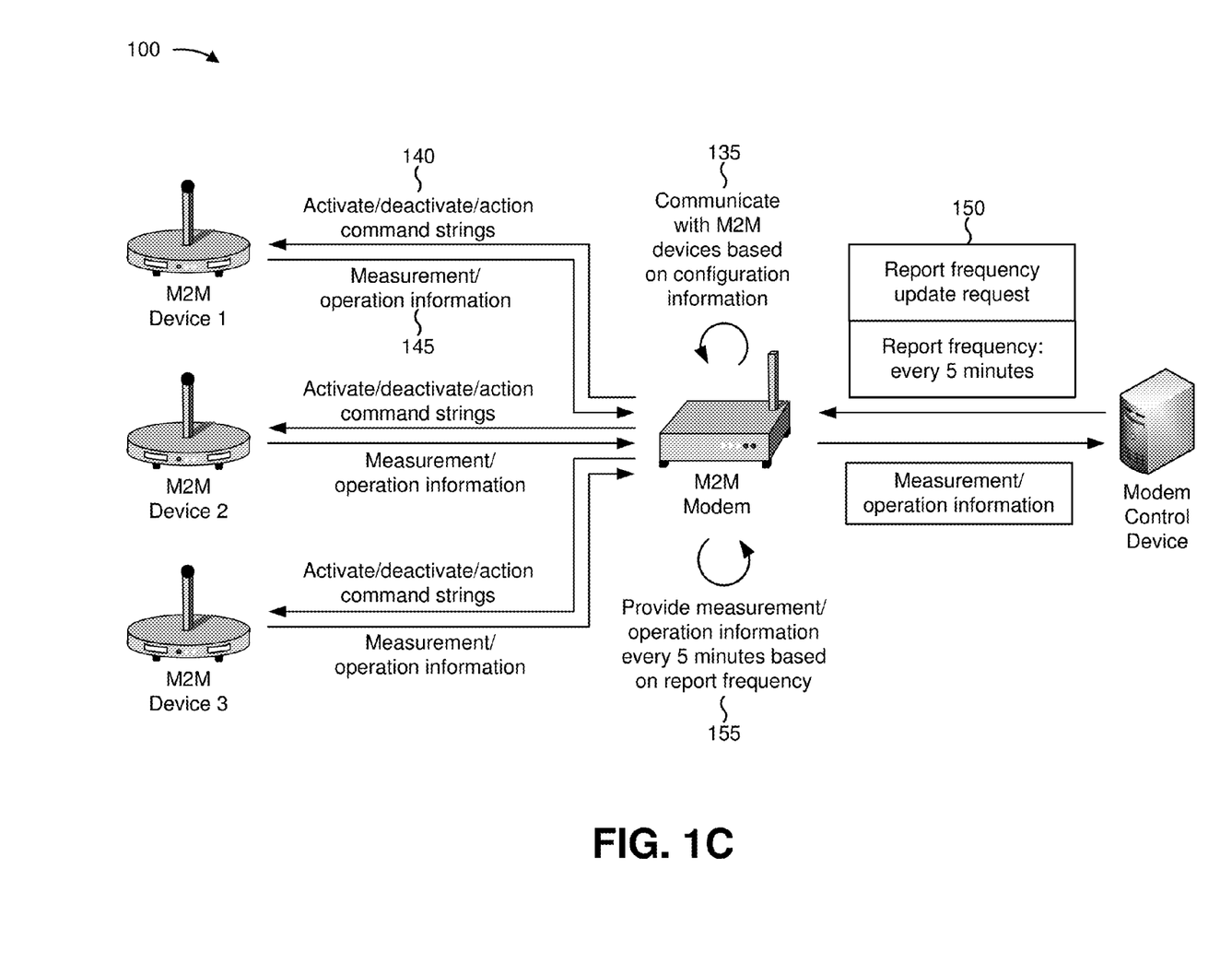

As shown in FIG. 1C, and by reference number 135, the M2M modem may communicate with the set of M2M devices based on the configuration information. For example, the M2M modem may transmit command strings to the set of M2M devices, as shown by reference number 140. As shown, a command string may cause an M2M device to activate, to deactivate, to perform an action (e.g., actuating a switch, changing a temperature, locking, unlocking, or any other action that an M2M device may perform), or the like. As shown by reference number 145, the M2M devices may provide measurement information and/or operation information to the M2M modem. In some cases, the M2M modem may request the measurement information and/or the operation information. Additionally, or alternatively, the M2M devices may provide the measurement information and/or the operation information to the M2M modem automatically (e.g., periodically, on startup, on shutdown, upon obtaining the measurement information and/or the operation information, during off-peak times, at scheduled times, etc.). The measurement information and/or the operational information for an M2M device may include, for example, information obtained by a sensor of the M2M device, a current operational status of the M2M device, data produced or gathered by the M2M device, or the like.

As shown by reference number 150, the modem control device may transmit a report frequency update request to the M2M modem. The report frequency update request may cause the M2M modem to change a frequency at which the M2M modem provides measurement/operation information to the modem control device. As shown, the report frequency update request identifies a report frequency of "every 5 minutes." As shown by reference number 155, based on the report frequency, the M2M modem may provide the measurement/operation information for the set of M2M devices to the modem control device every 5 minutes. In this way, the modem control devices specifies a report frequency for the set of M2M devices, which conserves network resources that may otherwise be used to transmit the measurement/operation information continuously, to request the measurement/operation information, or the like.

In this way, the modem control device configures the M2M modem via the mobile network to communicate with a set of M2M devices that are in communication with the M2M modem. By obtaining configuration information for the set of M2M devices from a server device that stores configuration information, the modem control device saves processor resources that may otherwise be used to manually configure the M2M modem to communicate with the set of M2M devices. By permitting other devices to communicate with the set of M2M devices based on the firmware installed on the M2M modem, the M2M modem conserves processor resources, time, and effort that would otherwise be used to configure the other devices to communicate with the set of M2M devices.

In some cases, the modem configuration message, the modem response message, the configuration information, the report frequency update request, and/or the measurement/operation information may be included in messages that include 256 or fewer bytes (e.g., may be included in a single message of 256 or fewer bytes, may be split into a group of messages of 256 or fewer bytes each, etc.), which conserves network resources.

Figure 2:
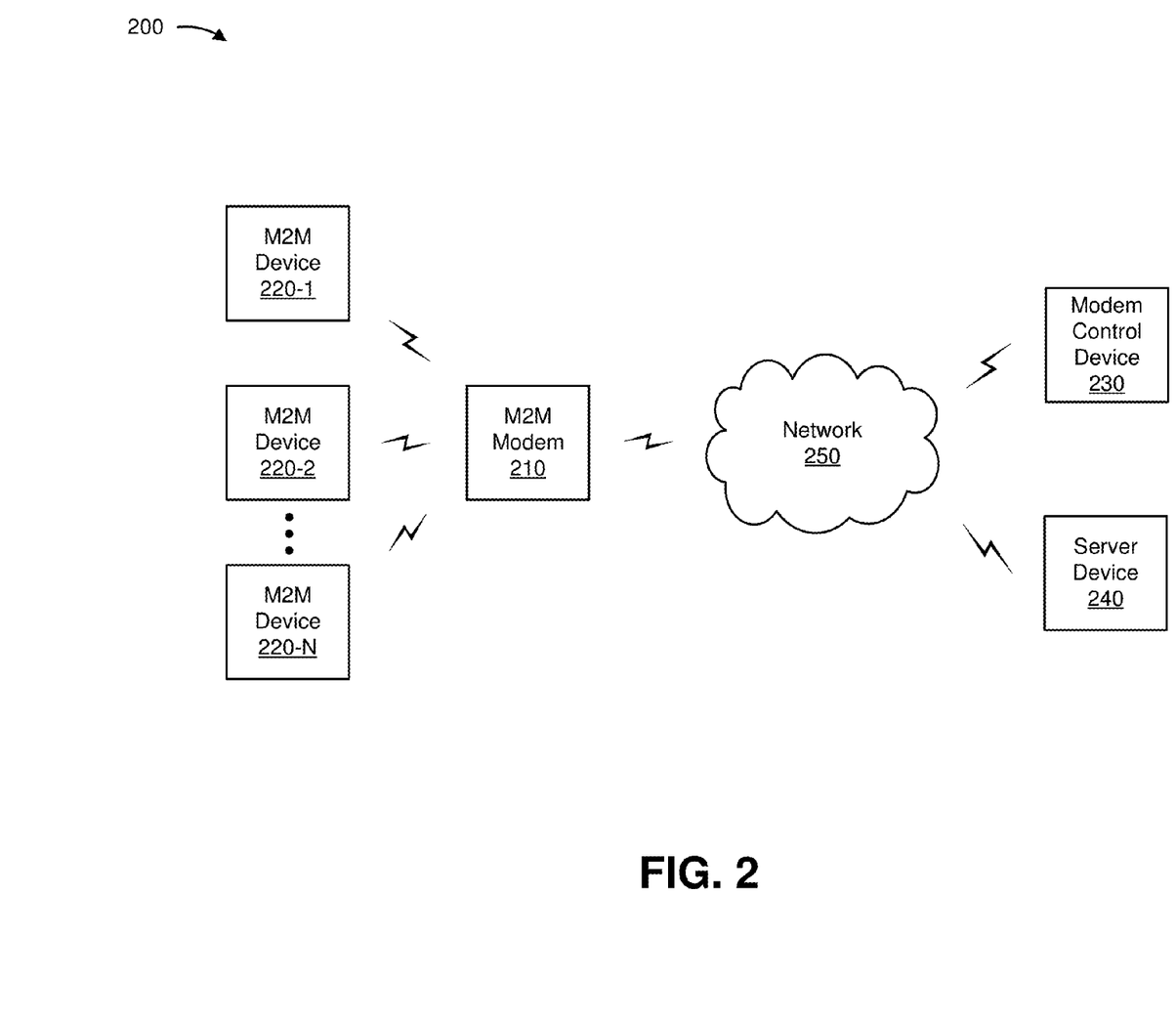
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a M2M modem 210, one or more M2M devices 220-1 through 220-N (N≥1) (hereinafter referred to collectively as "M2M devices 220," and individually as "M2M device 220"), a modem control device 230, a server device 240, and a network 250. Devices of environment 200 may interconnect via wired connections, wireless connections, or a combination of wired and wireless connections.

M2M modem 210 may include one or more communication and computing devices capable of communicating with M2M device 220, modem control device 230, and/or another device. For example, M2M modem 210 may include a modem, a router, a gateway, or a similar device. In some implementations, M2M modem 210 may be included in M2M device 220, or M2M device 220 may be included in M2M modem 210. Additionally, or alternatively, M2M modem 210 may communicate with one or more M2M devices 220 (e.g., via a wired connection, via a wireless connection, via a combination of wired and wireless connections, via a wireless local area network, such as a WiFi network, a Bluetooth network, or the like, etc.). In some implementations, M2M modem 210 may include a communication interface that allows M2M modem 210 to receive information from and/or transmit information to another device in environment 200.

M2M device 220 may include a device capable of receiving, processing, and/or providing information. For example, M2M device 220 may include a mobile phone (e.g., a smart phone, a radiotelephone, etc.), a computing device (e.g., a desktop computer, a laptop computer, a tablet computer, a handheld computer, a camera, an audio recorder, a camcorder, etc.), an appliance (e.g., a refrigerator, a microwave, a stove, etc.), a medical device, a vehicle, a light bulb, and/or any other smart device. In other words, M2M device 220 may be any "thing" in the Internet of Things (IoT). In some implementations, M2M device 220 may include a communication interface that allows M2M device 220 to receive information from and/or transmit information to another device in environment 200.

Modem control device 230 may include a device capable of receiving, generating, storing, processing, and/or providing information. For example, modem control device 230 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, a server device, or a similar device. In some implementations, modem control device 230 may be capable of controlling an M2M device 220 via M2M modem 210. In some implementations, modem control device 230 may include a communication interface that allows modem control device 230 to receive information from and/or transmit information to another device in environment 200.

Server device 240 may include one or more devices capable of storing, processing, and/or routing information. For example, server device 240 may include a server or a similar device. In some implementations, server device 240 may include a communication interface that allows server device 240 to receive information from and/or transmit information to other devices in environment 200.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
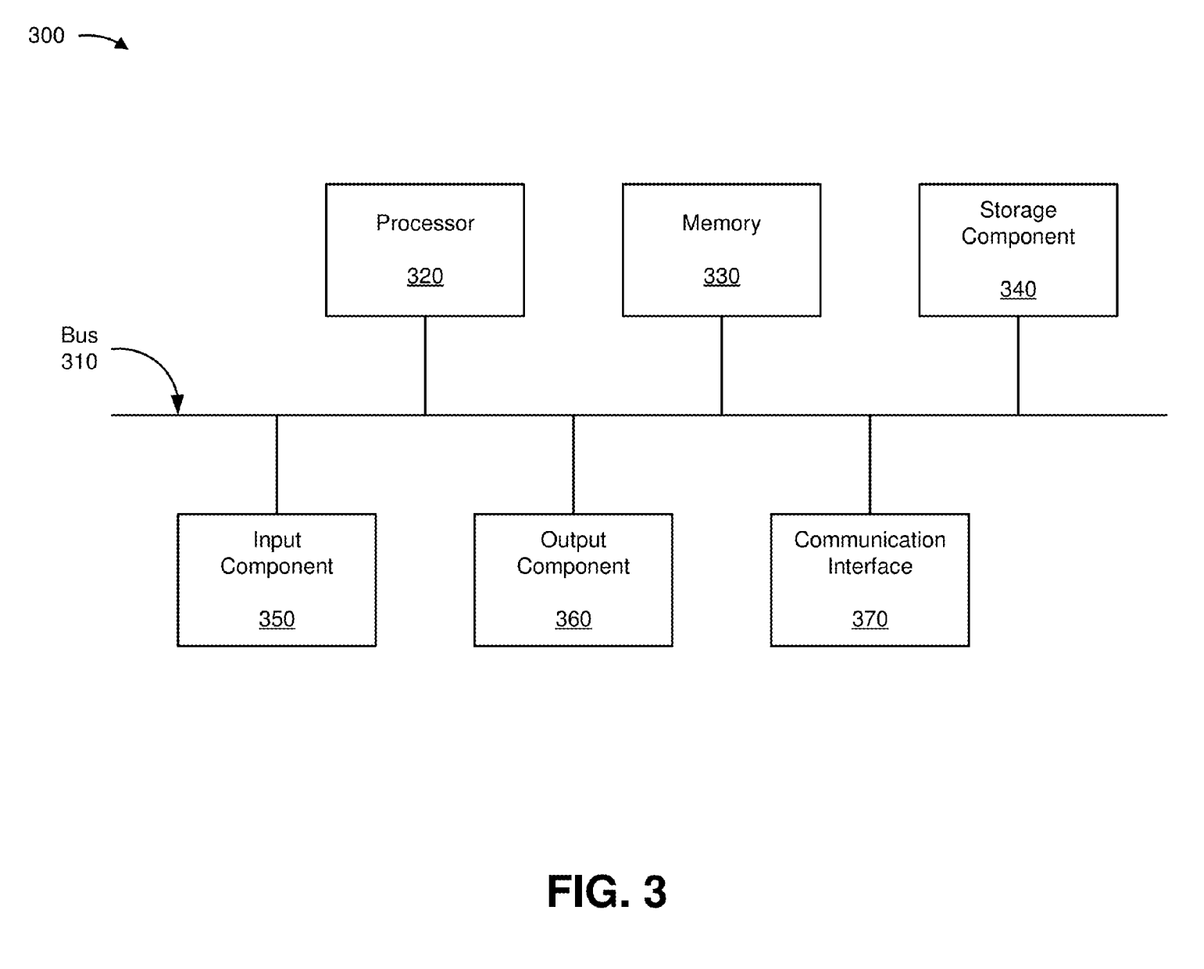
FIG. 3 is a diagram of example components of one or more devices of FIG. 2.

FIG. 3 is a diagram of example components of a device 300. Device 300 may correspond to M2M modem 210, M2M device 220, modem control device 230, and/or server device 240. In some implementations, M2M modem 210, M2M device 220, modem control device 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
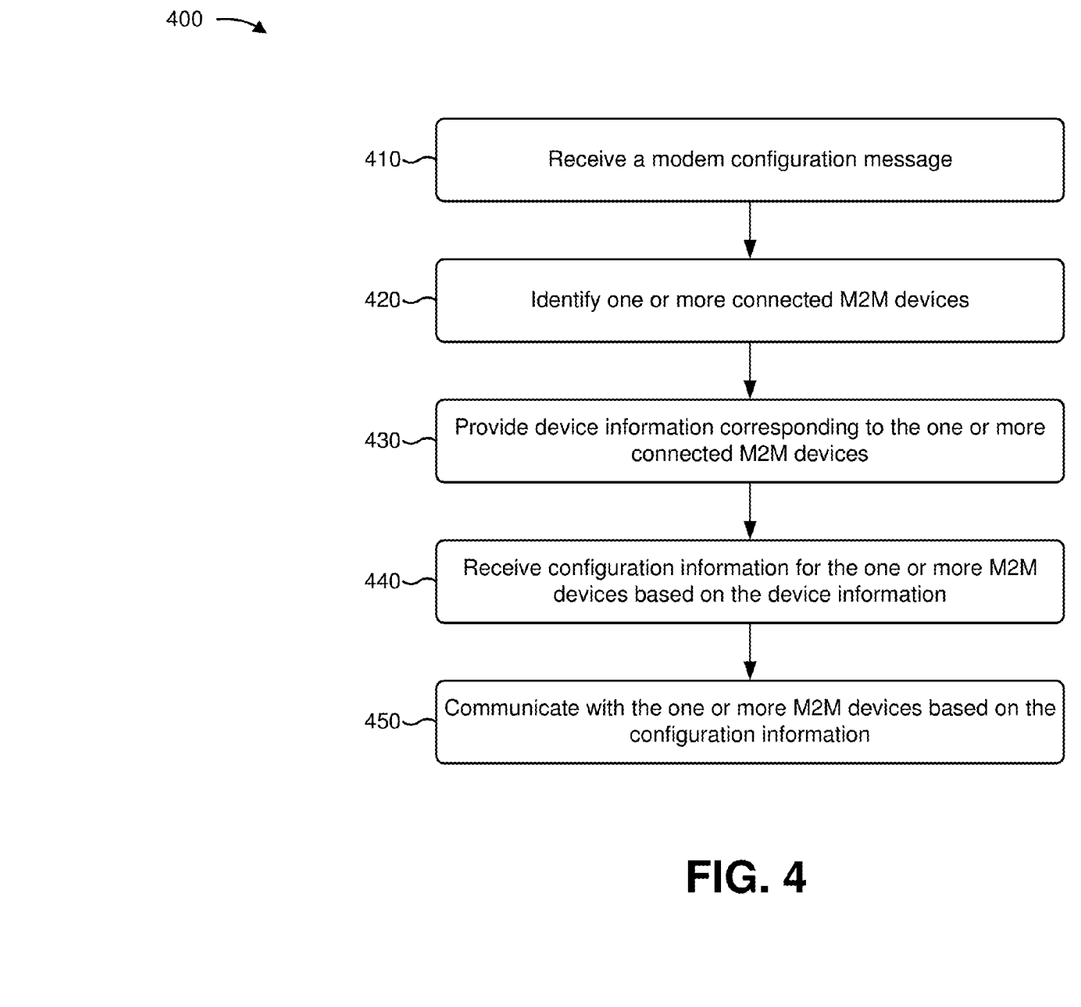
FIG. 4 is a flow chart of an example process for configuring a machine-to-machine modem based on a modem configuration message.

FIG. 4 is a flow chart of an example process 400 for configuring a machine-to-machine modem based on a modem configuration message. In some implementations, one or more process blocks of FIG. 4 may be performed by M2M modem 210. In some implementations, one or more process blocks of FIG. 4 may be performed by another device or a group of devices separate from or including M2M modem 210, such as M2M device 220, modem control device 230, and/or server device 240.

As shown in FIG. 4, process 400 may include receiving a modem configuration message (block 410). For example, M2M modem 210 may receive a modem configuration message. In some implementations, M2M modem 210 may receive the modem configuration message from modem control device 230. In some implementations, the modem configuration message may include a message identifier. For example, the modem configuration message may include a message identifier (e.g., one or more bits, characters, or the like) that identifies the modem configuration message. In some implementations, the modem configuration message may include 256 bytes or fewer, which conserves network resources and processor resources of modem control device 230.

In some implementations, the modem configuration message may include information identifying an update action. For example, the modem configuration message may include one or more bits, characters, or the like, that identify an update action for M2M modem 210 to perform. The update action may include providing a response to modem control device 230 identifying M2M devices 220 connected with M2M modem 210, resetting M2M modem 210, providing information identifying a board configuration associated with M2M modem 210, providing information identifying software executing on M2M modem 210, or the like.

In some implementations, modem control device 230 may transmit the modem configuration message periodically (e.g., once every five minutes, once per day, etc.). In some implementations, modem control device 230 may transmit the modem configuration message based on a request. For example, a user may provide a request for modem control device 230 to transmit a modem configuration message (e.g., based on an interaction with a client device, based on an interaction with modem control device 230, etc.), and modem control device 230 may transmit the modem configuration message based on the request.

Additionally, or alternatively, modem control device 230 may transmit the modem configuration message based on receiving information from M2M modem 210. For example, M2M modem 210 may provide a message to modem control device 230 based on a startup of M2M modem 210, based on M2M modem 210 connecting with a new M2M device 220, based on M2M modem 210 connecting to M2M control device 230, based on expiration of a time period, or the like. Modem control device 230 may provide the modem configuration message based on receiving the message from M2M modem 210.

As further shown in FIG. 4, process 400 may include identifying one or more connected M2M devices (block 420). For example, M2M modem 210 may be connected with one or more M2M devices 220 (e.g., based on a wireless connection, a wired connection, etc.). In some implementations, M2M modem 210 may be included in an M2M device 220. Additionally, or alternatively, M2M modem 210 may communicate with a set of M2M devices 220 (e.g., via a local wireless area network, such as a Bluetooth network, a WiFi network, a near field communication network, etc.) in a particular area. Based on receiving the modem configuration message, M2M modem 210 may identify one or more M2M devices 220 with which M2M modem 210 is connected. For example, in some implementations, M2M modem 210 may identify the one or more M2M devices 220 by exchanging messages with the one or more M2M devices 220. In some implementations, M2M modem 210 may identify the one or more M2M devices 220 by reading information, which identifies the one or more M2M devices 220, from a memory.

In some implementations, M2M modem 210 may obtain device information associated with M2M device 220. In some implementations, the device information may identify a type of M2M device 220. For example, if M2M device 220 is a smart refrigerator, the device information may indicate that M2M device 220 is a smart refrigerator, may identify a manufacturer of M2M device 220, a model of M2M device 220, a serial number of M2M device 220, an address associated with M2M device 220 (e.g., a network address, an International Mobile Subscriber Identity, a Mobile Device Number, an Internet Protocol address, a network port, a uniform resource identifier, a network address identifier, a fully qualified domain name, etc.), a firmware version associated with M2M device 220, or the like.

As further shown in FIG. 4, process 400 may include providing device information corresponding to the one or more connected M2M devices (block 430). For example, M2M modem 210 may provide, to modem control device 230, device information corresponding to one or more M2M devices 220 with which M2M modem 210 is connected. In some implementations, M2M modem 210 may provide the device information to modem control device 230. For example, M2M modem 210 may receive a modem configuration message from modem control device 230, and M2M modem 210 may provide the device information to modem control device 230 based on receiving the modem configuration message.

In some implementations, M2M modem 210 may provide the device information in a modem response message. In some implementations, the modem response message may include information relating to M2M modem 210 and/or M2M device 220. For example, the modem response message may include the device information, information identifying M2M modem 210 (e.g., a network address, an International Mobile Subscriber Identity, a Mobile Device Number, an Internet Protocol address, a network port, a uniform resource identifier, a network address identifier, a fully qualified domain name, etc.), location information associated with M2M modem 210 and/or M2M device 220 (e.g., global positioning system (GPS) data, information identifying a base station to which M2M modem 210 is connected, information identifying a last known location of M2M modem 210, a cell identifier, etc.), temperature information associated with M2M modem 210 and/or M2M device 220 (e.g., an internal temperature of a component of M2M modem 210 and/or M2M device 220, an external temperature of an environment where M2M modem 210 and/or M2M device 220 are located, etc.), data from M2M device 220 (e.g., sensor data, configuration data, etc.), a quantity of M2M devices 220 connected with M2M modem 210, or the like.

In some implementations, the modem response message may include a message identifier that is associated with the modem response message. For example, in a situation where M2M modem 210 receives a modem configuration message that includes a particular message identifier, M2M modem 210 may generate a modem response message that includes a corresponding message identifier (e.g., that matches the particular message identifier, that is generated based on the particular message identifier, that includes the particular message identifier, etc.). In some implementations, the modem response message may include 256 bytes or fewer, which conserves network resources and processor resources of modem control device 230.

In some implementations, the modem response message may include information identifying M2M devices 220 that were connected after a previous modem configuration message. For example, assume that a particular M2M device 220 is connected after M2M modem 210 provides a first modem response message based on a first modem configuration message. Assume further that M2M modem 210 receives a second modem configuration message after the particular M2M device 220 is connected. In that case, M2M modem 210 may provide a modem response message including device information for the particular M2M device 220, and may provide information indicating that the particular M2M device 220 was connected after the first modem configuration message was received by M2M modem 210. In some implementations, M2M modem 210 may not provide device information for M2M devices 220 that were connected with M2M modem 210 before the first modem configuration message was received by M2M modem 210. In this way, M2M modem 210 reduces a quantity of M2M devices 220 identified in the response to the modem configuration message, which conserves network resources.

In some implementations, M2M modem 210 may provide an update message to modem control device 230. The update message may include, for example, information regarding newly connected M2M devices 220, M2M devices 220 that are no longer connected, M2M devices 220 that have experienced a change (e.g., a change in location, a change in software, a change in configuration, a change in activity, etc.), one or more changes associated with M2M modem 210 (e.g., a battery status of M2M modem 210, a configuration status of M2M modem 210, etc.), or the like.

In some implementations, M2M modem 210 may provide a unique identifier in association with a modem response message and/or an update message. In some implementations, the unique identifier may include, for example, a device identifier associated with M2M modem 210, a string that identifies M2M modem 210 (e.g., a randomly generated string, etc.), or the like. Modem control device 230 may receive the unique identifier, and may associate M2M modem 210 and/or device information included in the modem response message and/or the update message with the unique identifier. In some implementations, modem control device 230 may store the unique identifier in association with the device information (e.g., in a profile associated with M2M modem 210).

As further shown in FIG. 4, process 400 may include receiving configuration information for the one or more M2M devices based on the device information (block 440). For example, M2M modem 210 may receive configuration information for the one or more M2M devices 220. M2M modem 210 may receive the configuration information based on the device information. For example, modem control device 230, server device 240, or another device may store configuration information for a particular M2M device 220 or a particular type of M2M device 220 in association with device information identifying the particular M2M device 220 or the particular type of M2M device 220, and may obtain and/or provide the configuration information to M2M modem 210 based on the device information.

The configuration information may include information relating to communicating with and/or operating M2M device 220. For example, the configuration information may include instructions to cause M2M device 220 to perform a function. As an example, assume that a particular command string (e.g., a string of one or more bits, bytes, characters, etc.) causes M2M device 220 to obtain sensor data and provide the sensor data to M2M modem 210. In that case, the configuration information may identify the particular command string and the function of obtaining the sensor data. In some implementations, the configuration information may include a device library for a particular M2M device 220, a particular type of M2M device 220, a particular firmware version of M2M device 220, or the like.

In some implementations, the configuration information may correspond to an application programming interface (API). The API may be associated with (e.g., executed on, implemented on, etc.) modem control device 230 or another device. The API may associate functions of M2M device 220 with configuration information. As an example, assume that a user wants to cause a smart light bulb to activate. Assume further that the smart light bulb is connected with M2M modem 210, and assume that modem control device 230 has provided configuration information to M2M modem 210 identifying a command string that causes the smart light bulb to activate. The user may interact with an API (e.g., on modem control device 230, on a client device that communicates with modem control device 230, etc.) that includes an interface element to cause the smart light bulb to activate. Based on receiving the API interaction, modem control device 230 may cause M2M modem 210 to transmit the command string to M2M device 220. The command string may cause M2M device 220 (e.g., the smart light bulb) to activate. In this way, M2M modem 210 and modem control device 230 facilitate operation of M2M device 220 based on an API, which reduces processor usage in connection with configuring and/or providing command strings associated with a variety of M2M devices 220.

In some implementations, modem control device 230 may obtain the configuration information based on locally stored information. For example, modem control device 230 may store a profile associated with M2M modem 210. The profile may identify one or more M2M devices 220 that are connected with M2M modem 210. For example, M2M modem 210 may provide information (e.g., in a modem response message, an update message, etc.) identifying M2M devices 220 with which M2M modem 210 is connected.

Additionally, or alternatively, M2M modem 210 may be associated with one or more M2M devices 220 when manufactured, in a predefined fashion, or the like. For example, a particular M2M modem 210 may be integrated with a particular M2M device 220 when manufactured. The particular M2M modem 210 may be associated with a profile (e.g., an entry in a data structure, such as a database, a table, etc.), stored by modem control device 230 and/or server device 240, that identifies the particular M2M modem 210 and the particular M2M device 220. In some implementations, the profile may be associated with a unique identifier. For example, M2M modem 210 may be associated with a unique identifier, and may transmit the unique identifier to modem control device 230 (e.g., in a modem response message). Modem control device 230 may identify the profile based on the unique identifier, and may identify M2M devices 220 with which M2M modem 210 is connected based on the profile. Modem control device 230 may provide device information for the M2M devices 220. In this way, M2M modem 210 conserves processor resources and network resources by transmitting the unique identifier, rather than the device information, in a modem response message.

In some implementations, M2M modem 210 may receive a firmware update that includes firmware for M2M modem 210. For example, modem control device 230 may provide a firmware update to M2M modem 210 in one or more messages. In some implementations, each of the one or more messages may include 256 bytes or fewer, which reduces network congestion.

As further shown in FIG. 4, process 400 may include communicating with the one or more M2M devices based on the configuration information (block 450). For example, M2M modem 210 may communicate with the one or more M2M devices 220 based on the configuration information. In some implementations, M2M modem 210 may receive information from the one or more M2M devices 220 (e.g., sensor information, information indicating an operational status of the one or more M2M devices 220, etc.), and may provide the information based on the configuration information. In some implementations, M2M modem 210 may provide the information in a message that includes 256 bytes or fewer, which conserves network resources.

In some implementations, M2M modem 210 may cause M2M device 220 to perform an action. For example, M2M modem 210 may receive an instruction from modem control device 230 to cause M2M device 220 to perform an action (e.g., based on an API instruction to modem control device 230 as described above, based on a time interval, based on modem control device 230 receiving particular information from M2M modem 210 and/or M2M device 220, etc.), and may transmit a command string based on the configuration information to cause M2M device 220 to perform the action. In this way, M2M modem 210 causes M2M device 220 to perform an action based on receiving an instruction from modem control device 230 and based on a command string associated with M2M device 220, which conserves processor resources associated with modem control device 230 to determine and provide the command string.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
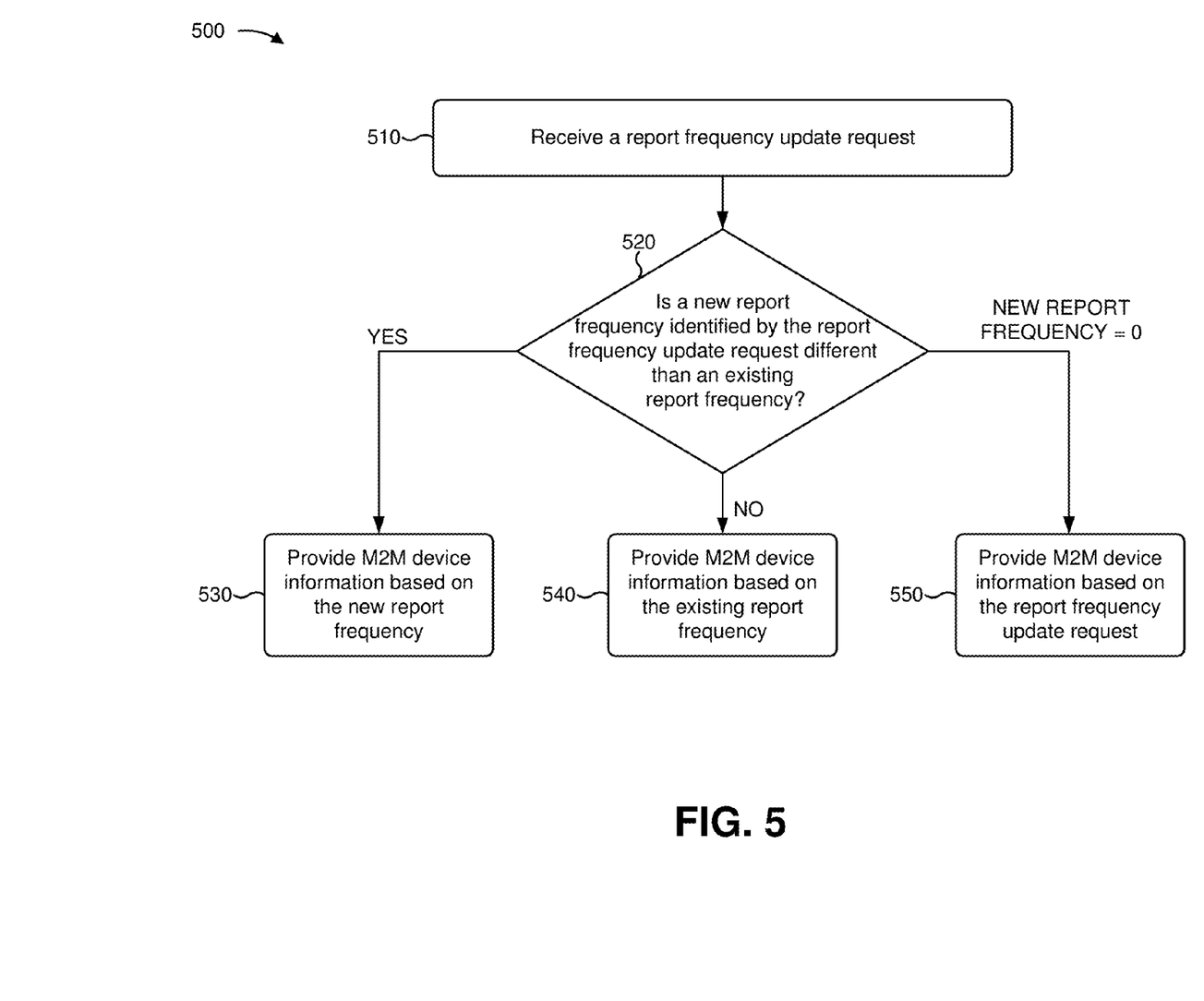
FIG. 5 is a flow chart of an example process for updating a report frequency for a machine-to-machine modem.

FIG. 5 is a flow chart of an example process 500 for updating a report frequency for a machine-to-machine modem. In some implementations, one or more process blocks of FIG. 5 may be performed by M2M modem 210. In some implementations, one or more process blocks of FIG. 5 may be performed by another device or a group of devices separate from or including M2M modem 210, such as M2M device 220, modem control device 230, and/or server device 240.

As shown in FIG. 5, process 500 may include receiving a report frequency update request (block 510). For example, M2M modem 210 may receive a report frequency update request from modem control device 230. The report frequency update request may specify a report frequency (e.g., a time interval, such as every thirty seconds, every five minutes, every day, at 2 am on Saturdays, etc.) at which to provide information from one or more M2M devices 220 with which M2M modem 210 is connected. For example, the one or more M2M devices 220 may gather information (e.g., sensor information, measurement information, operation information, etc.), and may provide the gathered information to M2M modem 210. M2M modem 210 may store the information, and may provide the information to modem control device 230 based on the report frequency identified in the report frequency update request. In some implementations, the report frequency update request may include 256 bytes or fewer, which conserves network and processor resources associated with transmitting and receiving the report frequency update request.

In some implementations, the report frequency update request may include information specifying one or more M2M devices 220 to associate with a particular report frequency. For example, the report frequency update request may include device information that identifies one or more M2M devices 220. M2M modem 210 may provide information from the one or more M2M devices 220 based on a report frequency included in the report frequency update request. In this way, modem control device 230 may specify different report frequencies for different M2M devices 220, which conserves network and processor resources of M2M modem 210 and/or modem control device 230.

In some implementations, the report frequency update request may include a message identifier. For example, the report frequency update request may include one or more bits, characters, etc. that identify the report frequency update request. In some implementations, the message identifier may be unique (e.g., may not be shared with another report frequency update request).

As further shown in FIG. 5, process 500 may include determining whether a new report frequency identified by the report frequency update request is different than an existing report frequency (block 520). For example, M2M modem 210 may store information identifying existing report frequencies for one or more M2M devices 220 with which M2M modem 210 is connected. In some implementations, M2M modem 210 may store a data structure that identifies M2M devices 220 and respective existing report frequencies for the M2M devices 220. M2M modem 210 may receive a report frequency update request that identifies new report frequencies for one or more M2M devices 220, and may determine whether the new report frequencies are different than the existing report frequencies for the one or more M2M devices 220.

As further shown in FIG. 5, if the new report frequency is different than the existing report frequency (block 520—YES), process 500 may include providing M2M device information based on the new report frequency (block 530). For example, if a new report frequency for M2M device 220 is different than an existing report frequency, M2M modem 210 may provide M2M device information for M2M device 220 based on the new report frequency (e.g., periodically, based on a length of time specified by the new report frequency, etc.).

In some implementations, M2M modem 210 may request information from M2M device 220 based on the new report frequency, and may provide the information as M2M modem 210 receives the information. In this way, M2M modem 210 conserves storage space local to M2M modem 210. In some implementations, M2M modem 210 may receive information from M2M device 220 (e.g., periodically, in a continuous stream, based on one or more requests from M2M modem 210, etc.), may store the received information locally, and may provide the stored information to modem control device 230 based on the new report frequency. In this way, M2M modem 210 conserves network and processor resources of M2M device 220 by reducing a quantity of requests for information to be transmitted to and processed by M2M device 220.

As further shown in FIG. 5, if the new report frequency is not different than the existing report frequency (block 520—NO), process 500 may include providing M2M device information based on the existing report frequency (block 540). For example, M2M modem 210 may determine that a new report frequency is equal to an existing report frequency for M2M device 220. In such a case, M2M modem 210 may continue to provide M2M device information for M2M device 220 based on the existing report frequency (e.g., periodically, based on a length of time specified by the existing report frequency, etc.).

As further shown in FIG. 5, if the new report frequency is equal to zero (block 520—NEW REPORT FREQUENCY=0), process 500 may include providing M2M device information based on the report frequency update request (block 550). For example, if the new report frequency is equal to zero, M2M modem 210 may provide M2M device information to modem control device 230 based on (e.g., in response to, within a particular time period of receiving, etc.) the report frequency update request. In some implementations, M2M modem 210 may obtain M2M device information from one or more M2M devices 220 identified by the report frequency update request, and may provide the M2M device information to modem control device 230. In some implementations, M2M modem 210 may collect M2M device information from M2M devices 220 with which M2M modem 210 is connected, and may provide the collected M2M device information to modem control device 230 based on the report frequency update request.

In some implementations, M2M modem 210 may provide the M2M device information in a single message. In some implementations, the single message may include 256 bytes or fewer, which may conserve network resources of network 250. Additionally, or alternatively, M2M modem 210 may provide the M2M device information in a set of messages. For example, M2M modem 210 may split the M2M device information into a set of segments, and may provide the set of segments in a set of messages. In some implementations, each message of the set of messages may include information (e.g., a header, a footer, etc.) that identifies a relative position of the message, in relation to other messages in the set of messages. In some implementations, one or more messages of the set of messages may include 256 bytes or fewer, which conserves processor and/or network resources of M2M modem 210 and/or modem control device 230.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, an M2M modem conserves processor resources that would otherwise be used to configure a device to communicate with different M2M devices. Further, the M2M modem conserves network resources by reducing a quantity and/or size of messages transmitted to and from the M2M devices via the network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A machine-to-machine (M2M) modem, comprising:
one or more processors to:
receive a request for device information identifying one or more M2M devices that are connected with the M2M modem;
obtain the device information from the one or more M2M devices;
provide the device information;
receive configuration information, based on which to communicate with the one or more M2M devices, based on providing the device information,
the configuration information corresponding to an application programming interface (API) and including one or more instructions that cause the one or more M2M devices to perform a function;
transmit a command to the one or more M2M devices, based on the configuration information and an interaction with the API, to cause the one or more M2M devices to perform the function,
receive a report frequency update request that specifies an updated report frequency for M2M device information,
the report frequency update request including the device information, and the report frequency update request enabling different report frequencies for different M2M devices; and provide the M2M device information based on the updated report frequency.

2. The M2M modem of claim 1, where the function is a first function; and where the one or more processors are further to:
receive an instruction to cause an M2M device, of the one or more M2M devices, to perform a second function,
the second function being different than the first function;
determine another command string associated with the second function based on the configuration information; and
provide the other command string to the M2M device to cause the M2M device to perform the second function.

3. The M2M modem of claim 1, where the one or more processors are further to:
receive sensor information or operation information from the one or more M2M devices; and
provide the sensor information or the operation information.

4. The M2M modem of claim 1, where the request for device information is a first request; and
where a subset of the one or more M2M devices are newly connected M2M devices,
the newly connected M2M devices being connected with the M2M modem after a second request for device information was received,
the second request for device information being received before the first request; and
where the one or more processors, when providing the device information, are to:
provide device information for the newly connected M2M devices without providing device information for one or more other M2M devices of the one or more M2M devices,
the one or more other M2M devices being connected before the first request was received.

5. The M2M modem of claim 1, where the one or more processors are further to:
receive a message identifying a report frequency,
the report frequency specifying a length of time based on which to provide sensor information or operation information obtained from the one or more M2M devices;
obtain the sensor information or the operation information from the one or more M2M devices; and
provide the sensor information or the operation information based on the report frequency.

6. A non-transitory computer-readable medium storing instructions, the instructions comprising:
one or more instructions that, when executed by one or more processors of a machine-to-machine (M2M) modem, cause the one or more processors to:
receive a request for device information identifying one or more M2M devices that are connected with the M2M modem;
obtain the device information from the one or more M2M devices;
provide the device information;
receive configuration information, based on which to communicate with the one or more M2M devices, based on providing the device information,
the configuration information corresponding to an application programming interface (API) and including one or more instructions that cause the one or more M2M devices to perform a function;
transmit a command to the one or more M2M devices, based on the configuration information and an interaction with the API, to cause the one or more M2M devices to perform the function,
receive a report frequency update request that specifies an updated report frequency for M2M device information,
the report frequency update request including the device information, and
the report frequency update request enabling different report frequencies for different M2M devices; and
provide, to a modem control device, the M2M device information based on the updated report frequency.

7. The non-transitory computer-readable medium of claim 6, where the device information for an M2M device, of the one or more M2M devices, includes information identifying one or more of:
a manufacturer of the M2M device,
a model of the M2M device,
a serial number of the M2M device,
a firmware version associated with the M2M device,
an International Mobile Subscriber Identity of the M2M device,
an Internet Protocol address of the M2M device,
a network port of the M2M device,
a uniform resource identifier associated with the M2M device,
a network address identifier for the M2M device, or
a fully qualified domain name for the M2M device.

8. The non-transitory computer-readable medium of claim 6, where the configuration information for an M2M device, of the one or more M2M devices, includes one or more of:
a device library for the M2M device,
a messaging protocol for the M2M device, or
one or more command strings that, when received by the M2M device, cause the M2M device to perform one or more respective actions.

9. The non-transitory computer-readable medium of claim 6, where the one or more instructions, when executed by the one or more processors, further cause the one or more processors to:
obtain sensor information or operation information from the one or more M2M devices; and
provide the sensor information or the operation information.

10. The non-transitory computer-readable medium of claim 9, where the one or more instructions, when executed by the one or more processors, further cause the one or more processors to:
divide the sensor information or the operation information into a plurality of segments; and
where the one or more instructions, that cause the one or more processors to provide the sensor information or the operation information, cause the one or more processors to:
provide the plurality of segments in a respective plurality of messages.

11. The non-transitory computer-readable medium of claim 6, where the M2M modem is included in an M2M device of the one or more M2M devices.

12. A method, comprising:
receiving, by a machine-to-machine (M2M) modem, a request for device information identifying a plurality of M2M devices that are connected with the M2M modem;
obtaining, by the M2M modem and from the plurality of M2M devices, the device information identifying the plurality of M2M devices;
providing, by the M2M modem and to a device that transmitted the request for the device information, the device information;
receiving, by the M2M modem, configuration information, based on which to communicate with the plurality of M2M devices, based on providing the device information,
    the configuration information corresponding to an application programming interface (API) and including one or more instructions that cause the plurality of M2M devices to perform a function;
transmitting, by the M2M modem, a command to the plurality of M2M devices, based on the configuration information and an interaction with the API, to cause the plurality of M2M devices to perform the function;
receiving, by the M2M device and from a modem control device, a report frequency update request that specifies an updated report frequency for M2M device information,
    the report frequency update request including the device information, and
    the report frequency update request enabling different report frequencies for different M2M devices; and
providing, by the M2M device and to the modem control device, the M2M device information based on the updated report frequency.

13. The method of claim 12, where receiving the configuration information comprises:
receiving the configuration information based on an identifier provided in association with the device information,
    the identifier being associated with the M2M modem, and
    a device that transmitted the request for the device information obtaining the configuration information based on the identifier.

14. The method of claim 12, further comprising:
receiving a message identifying a report frequency,
    the report frequency specifying a length of time based on which to provide information obtained from the plurality of M2M devices;
obtaining the information from the plurality of M2M devices; and
providing the information based on the report frequency.

15. The method of claim 14, where the message identifying the report frequency identifies a particular report frequency for a particular M2M device of the plurality of M2M devices; and
where providing the information comprises:
    providing information associated with the particular M2M device at the particular report frequency.

16. The method of claim 12, where receiving the request comprises:
receiving the request in a message that includes 256 bytes or fewer; and
where providing the device information comprises:
    providing the device information in one or more messages,
        each message, of the one or more messages, including 256 bytes or fewer.

17. The M2M modem of claim 1, where the one or more processors are further to:
receive a modem configuration message identifying an update action.

18. The M2M modem of claim 1, where the interaction with the API is an interaction by a user.

19. The non-transitory computer-readable medium of claim 6, where the one or more instructions, when executed by the one or more processors, are further to:
receive a modem configuration message periodically,
    the modem configuration message identifying an update action to be performed.

20. The method of claim 12, further comprising:
receiving a modem configuration message identifying an update action,
    the update action including at least one of:
        providing a response identifying the one or more M2M devices,
        providing information identifying a board configuration associated with the M2M modem, or
        providing information identifying a software being executed on the M2M modem.

* * * * *